United States Patent Office 3,528,974
Patented Sept. 15, 1970

3,528,974
DIHYDRO-1,3-BENZOXAZINE-2,4-DIONE
Kurt Engel, Basel, Switzerland, assignor to Robapharm A.G., Basel, Switzerland, a Swiss company
No Drawing. Filed Jan. 24, 1966, Ser. No. 522,390
Claims priority, application Switzerland, Jan. 25, 1965, 997/65
Int. Cl. C07d 87/08
U.S. Cl. 260—244                    1 Claim

ABSTRACT OF THE DISCLOSURE

The present disclosure provides for a compound encompassed by the formula:

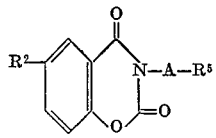

and salts thereof with pharmaceutically acceptable acids, in which $R^2$ represents a member selected from the group consisting of H, halogen, carb(lower)alkoxy amino, carb(lower)alkenoxy amino, $R^5$ represents a member selected from the group consisting of di(lower)alkyl amino, morpholinyl, pyridyl, lower alkyl pyridyl, quinolinyl, and A is selected from linear and branched lower alkylene, and in which A is not ethylene when $R^5$ is pyridyl. The disclosure also provides for a method of preparing such compounds by reacting the corresponding halobenzoxazine derivative with an amine in a solvent such as alcohol or dimethyl-formamide.

---

The present invention relates to compounds of the formula:

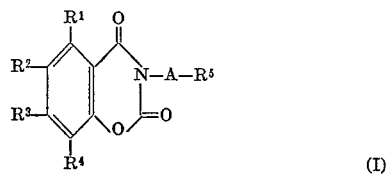

in which $R^1$, $R^2$, $R^3$ and $R^4$ are identical or different and each denotes H, halogen, carb(lower)alkoxyamino, carb(lower) alkenoxyamino or lower alkyl radicals, $R^5$ denotes dialkylamino or the radical of a heterocyclic amine, for example the pyridine, lower alkyl-pyridine, morpholine, quinoline radicals, etc., and A denotes a saturated alkylene radical which may also be branched, for example an alkylene radical having two to three carbon atoms, with the exception that A does not denote ethylene when $R^5$ denotes a pyridine radical, in which case, A is preferably $CH_2$.

The invention extends also to pharmaceutically acceptable salts of compounds I with inorganic or organic acids, i.e. for example to salts such as acetates, hydrochlorides, phosphates, carbonates, citrates, methanesulfonates, tartrates and the like.

Compounds of the above Formula I which are basically substituted in 3-position, and their salts, are prepared by reacting the sodium salt of dihydro-1,3-benzoxazine-2,4-dione or of corresponding substituted or unsubstituted dihydro-1,3-benzoxazine-2,4-diones with appropriate haloalkyldialkylamines or halides or heterocyclic alkylamines, for example picolyl halides, in a solvent or diluent, for example alcohol, dimethylformamide or the like.

These compounds may also be prepared from the corresponding halobenzoxazine derivatives by reaction with secondary amines or heterocyclic amines in a solvent, for example, benzene, toluene or alcohol.

Compounds I according to this invention exhibit interesting pharmacodynamic properties. They have a very good action as analgesics and antipyretics, with surprisingly low toxicity. Administration may e.g. be oral, in the form of conventionally prepared tablets, etc. They may be used as pharmaceuticals or as intermediates for the preparation of medicaments.

The invention is illustrated by the following examples.

EXAMPLE 1

Production of the compound having the formula:

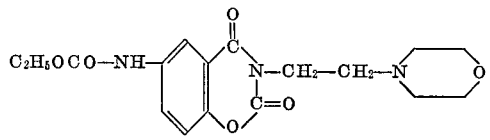

13.6 g. (0.05 mole) of the sodium salt of 6-carbethoxy-aminodihydro-1,3-benzoxazine-2,4-dione is suspended in 90 ccm. of alcohol and then 7.15 g. of chloroethylmorpholine is added. The whole is then heated under reflux for five hours, and suction filtered while hot. The solution is concentrated and the residue is poured into water. A white powder is precipitated which is suction filtered. The residue is recrystallized from alcohol. The yield is 13.4 g. and the melting point is 176° to 178° C.

The toxicity of this compound perorally with mice is found to be $DL_{50}$ more than 800 mg./kg.

EXAMPLE 2

18.6 g. (0.1 mole) of the sodium salt of dihydro-1,3-benzoxazine-2,4-dione is suspended in 50 ccm. of dimethylformamide and while stirring 3-picolyl chloride (precipitated as free base from 19.4 g. of the hydrochloride, 20% excess) is added.

Stirring is continued for five hours at 60° to 65° C. When the reaction is over, the whole is cooled. The reaction product is poured onto saturated sodium chloride solution and the deposited product is filtered off and recrystallised from alcohol.

The compound having the following formula is obtained:

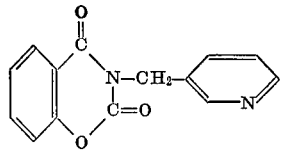

Its melting point is 132° to 134° C. Analysis for nitrogen—calculated: 11.01%, found: 10.96%.

EXAMPLE 3

Production of the compound having the formula:

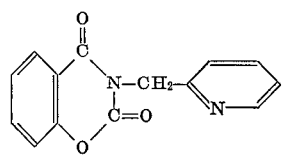

18.6 g. (0.1 mole) of the sodium salt of dihydro-1,3-benzoxazine-2,4-dione is suspended in 50 ccm. of dimethylformamide and while stirring 13.1 g. (including 10% excess) of 2-picolyl chloride (distilled) is added. Stirring is continued for five hours at 60° to 65° C. The reaction mixture is then cooled to room temperature and poured onto about half a litre of saturated sodium chloride solution. The deposited product is filtered off and recrystallised from ethyl alcohol. Its melting point is 124° to 125° C.

*Analysis.*—Calculated (percent): C, 66.10; H, 3.93; N, 11.01. Found (percent): C, 65.95; H, 3.99; N, 11.02.

EXAMPLE 4

The compound having the formula:

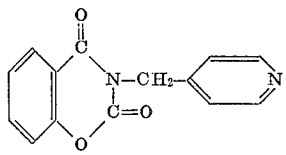

is obtained by the method of Example 2 or 3 from the sodium salt of dihydro-1,3-benzoxazine-2,4-dione with 4-picolyl chloride. Its melting point is 159° to 161° C. Analysis for nitrogen—calculated: 11.01%, found: 10.97%.

EXAMPLE 5

The compound having the formula:

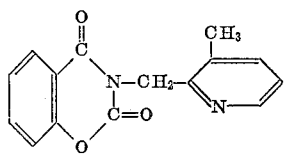

is obtained from the sodium salt of dihydro-1,3-benzoxazine-2,4-dione with 6-methyl-2-picolyl chloride by the method of Example 3, but stirring for five hours over a boiling water bath. Its melting point is 129° to 130° C. Analysis for nitrogen—calculated: 10.43%, found: 10.28%.

EXAMPLE 6

The compound having the formula:

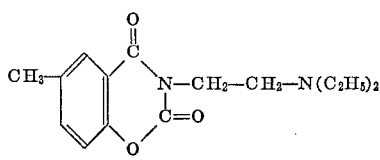

is prepared as follows.

10 g. (0.05 mole) of sodium salt of 6-methyldihydro-1,3-benzoxazine-2,4-dione is suspended in 50 ccm. of dimethylformamide and while stirring 7.5 g. (including 10% excess) of 2-diethylaminoethyl chloride (distilled) is added. Stirring is continued for five hours over a boiling waterbath. The reaction mixture is then cooled to room temperature and poured onto about half a litre of saturated common salt solution. After a single extraction with ethyl acetate, the base is precipitated from the aqueous phase with potassium carbonate. The product is extracted with ethyl acetate, the base is precipitated from the aqueous phase with potassium carbonate. The product is extracted with ethyl acetate and the extract is concentrated. A viscous colourless syrup is obtained, which is distilled. Boiling point at 0.025 mm. Hg: 145° to 147° C. Analysis for nitrogen—calculated: 10.13%, found: 10.22%.

EXAMPLE 7

The compound having the formula:

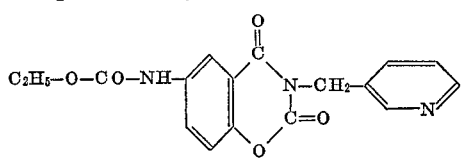

is obtained from the sodium salt of dihydro-1,3-benzoxazine-2,4-dione-6-carbamic acid ethyl ester and 3-picolyl chloride by the method of Example 2 or 5, but recrystallising from dioxane. It has a melting point of 218° to 219° C. Analysis for nitrogen—calculated: 12.31%, found: 12.24%.

EXAMPLE 8

The compound having the formula:

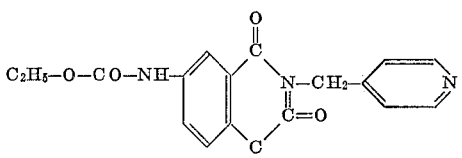

is obtained from the sodium salt of dihydro-1,3-benzoxazine-2,4-dione-6-carbamic acid ethyl ester and 4-picolyl chloride by the method of Example 2 or 5. Melting point after recrystallisation from alcohol: 207° to 209° C. Analysis for nitrogen—calculated: 12.31%, found: 11.98%.

EXAMPLE 9

The compound having the formula:

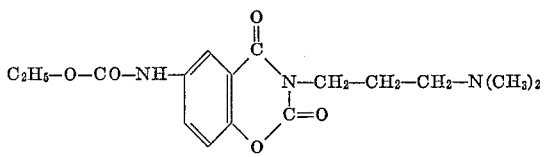

is obtained from the sodium salt of dihydro-1,3-benzoxazine-2,4-dione-6-carbamic acid ethyl ester and 3-dimethylamino-1-propyl chloride by the process of Example 2 or 5. Melting point after recrystallisation from ethyl acetate: 143° to 145° C. Analysis for nitrogen—calculated: 12.52%, found: 12.46%.

Preparation of the hydrochloride: The free base is boiled up with dilute hydrochloric acid, allowed to crystallise out and is then recrystallised from ethyl alcohol. The hydrochloride of the above compound is obtained. Its melting point is 206° to 208° C. and analysis for nitrogen—calculated: 11.30%, found: 11.29%.

EXAMPLE 10

The compound having the formula:

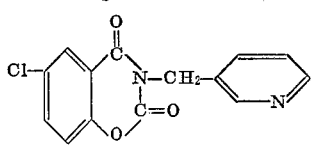

is obtained from the sodium salt of 6-chlorodihydro-1,3-benzoxazine-2,4-dione with 3 picolyl chloride by the method of Example 2 or 3. Its melting point is 147° to 149° C. Analysis for nitrogen—calculated: 9.71%, found: 9.43%.

EXAMPLE 11

The compound having the formula:

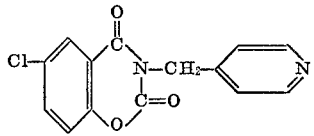

is obtained from the sodium salt of 6-chlorodihydro-1,3-benzoxazine-2,4-dione with 4-picolyl chloride by the method of Example 2 or 3. It has a melting point of 157° to 159° C. Analysis for nitrogen—calculated: 9.71%, found: 9.46%.

EXAMPLE 12

The compound having the formula:

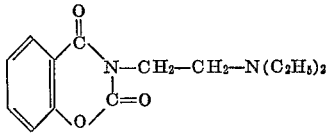

is obtained as follows. 22.5 g. (0.1 mole) of 3-β-chloroethyldihydro-1,3-benzoxazine-2,4-dione (melting point 108° to 109° C.) is suspended in 50 ccm. of toluene and while stirring 16.0 g. (including 10% excess) of diethylamine is added. Stirring is continued for fifteen hours at 80° to 90° C. The hot reaction mixture is suction filtered and after the filtrate has cooled it is extracted with dilute hydrochloric acid. The aqueous phase is made alkaline with potassium carbonate and extracted with ether. The ether is concentrated and a viscous oil is obtained which is distilled. It has a boiling point of 165° to 166° C. at 0.2 mm. Hg. Analysis for nitrogen—calculated: 10.67%, found: 10.69%.

EXAMPLE 13

11.25 g. (0.05 mole) of 3-chloroethyldihydro-1,3- benzoxazine-2,4-dione is heated under reflux in 50 ccm. of benzene with 8.7 g. of morpholine while stirring for eight hours and then allowed to cool. Deposited morpholine hydrochloride is filtered off and the benzene solution is extracted with 2 N hydrochloric acid. The acid solution is then made alkaline with potassium carbonate and extracted with ether. The ether is distilled off and the residue is recrystallised from alcohol. It has a melting point of 103° to 105° C. A compound having the following constitution is obtained:

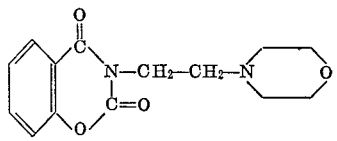

EXAMPLE 14

The compound having the formula:

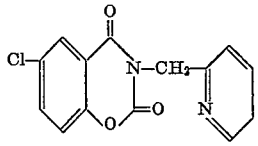

is obtained from the sodium salt of 6-chlorodihydro-1,3-benzoxazine-2,4-dione with 2-picolyl chloride by the method of Example 3. It has a melting point of 153° to 154° C. Analysis for nitrogen—calculated: 9.71%, found: 9.67%.

EXAMPLE 15

The compound having the formula:

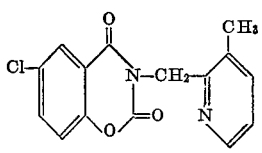

is obtained from the sodium salt of 6-chlorodihydro-1,3-benzoxazine-2,4-dione with 6-methyl-2-picolyl chloride by the method of Example 5. It has a melting point of 165° to 166° C. Analysis for nitrogen—calculated: 9.25%, found: 9.12%.

EXAMPLE 16

The compound having the formula:

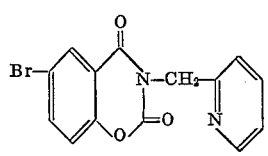

is obtained from the sodium salt of 6-bromodihydro-1,3-benzoxazine-2,4-dione with 2-picolyl chloride by the method of Example 3. It has a melting point of 178° to 180° C. Analysis for nitrogen—calculated: 8.40%, found: 8.49%.

EXAMPLE 17

The compound having the formula:

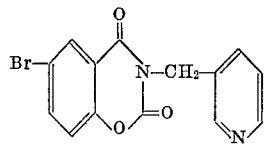

is obtained from the sodium salt of 6-bromodihydro-1,3-benzoxazine-2,4-dione with 3-picolyl chloride by the method of Example 3. It has a melting point of 170° to 171° C. Analysis for nitrogen—calculated: 8.40%, found: 8.48%.

EXAMPLE 18

The compound having the formula:

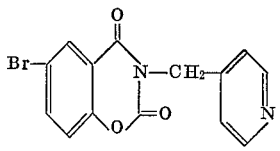

is obtained from the sodium salt of 6-bromodihydro-1,3-benzoxazine-2,4-dione with 4-picolyl chloride by the method of Example 3. It has a melting point of 170° to 171° C. Analysis for nitrogen—calculated: 8.40%, found: 8.35%.

EXAMPLE 19

The compound having the following formula:

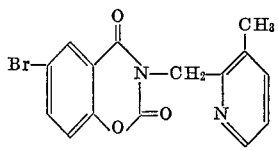

is obtained from the sodium salt of 6-bromodihydro-1,3-benzoxazine-2,4-dione with 6-methyl-2-picolyl chloride by the method of Example 5. It has a melting point of 179° to 181° C. Analysis for nitrogen—calculated: 8.08%, found: 8.14%.

EXAMPLE 20

The compound having the formula:

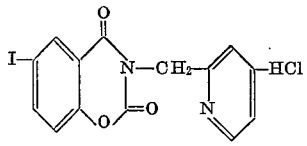

is obtained from the sodium salt of 6-iododihydro-1,3-benzoxazine-2,4-dione by the method of Example 3 with 2-picolyl chloride, but boiling up the free base with dilute hydrochloric acid and allowing the product to crystallise. The hydrochloride has a melting point of 200° to 202° C. Analysis for nitrogen—calculated: 6.73%, found 6.73%. Melting point of free base: 195° to 197° C. Analysis for nitrogen—calculated: 7.36%, found: 7.38%.

EXAMPLE 21

Production of the compound having the formula:

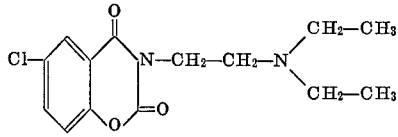

22 g. (0.1 mole) of the sodium salt of 6-chlorodihydro-1,3-benzoxazine-2,4-dione is suspended in 100 ccm. of dried and freshly distilled dimethylformamide and while stirring 16.3 g. (including 20% excess) of 2-diethylaminoethyl chloride (distilled) is added. Stirring is continued for five hours on a boiling waterbath. The reaction mixture is then allowed to cool to room temperature and poured onto about half a litre of saturated sodium chloride solution, the reaction product thus being precipitated in oily form. The aqueous phase is extracted with ethyl acetate and this in turn with dilute hydrochloric acid. The acid phase is evaporated to dryness and the residue is recrystallised from a mixture of ethyl alcohol and acetone. The hydrochloride has a melting point of 219° to 220° C. Analysis for nitrogen—calculated: 8.41%, found: 8.30%.

EXAMPLE 22

Production of the compound having the formula:

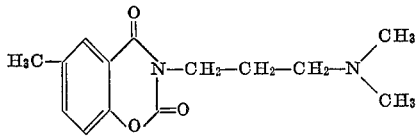

20 g. (0.1 mole) of the sodium salt of 6-methyldihydro-1,3-benzoxazine-2,4-dione is suspended in 60 ccm. of dimethylformamide and while stirring 13.4 g. (including 10% excess) of 3-dimethylamino-1-propyl chloride (distilled) is added. Stirring is continued for five hours on a boiling waterbath. The reaction mixture is then cooled to room temperature and poured onto about 0.8 litre of saturated sodium chloride solution. The precipitated reaction product is suction filtered and the filtered material (which still contains sodium chloride) is distributed between water and chloroform. The chloroform is concentrated and the remaining oil, which becomes a crystalline solid after some time, is recrystallised from a mixture of ether and hexane. It has a melting point of 77° to 78° C. Analysis for nitrogen—calculated: 10.68%, found: 10.70%.

EXAMPLE 23

The compound having the following formula:

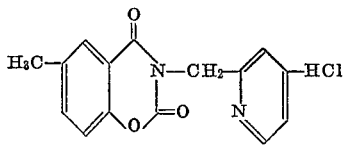

is obtained from the sodium salt of 6-methyldihydro- 1,3-benzoxazine-2,4-dione with 2-picolyl chloride by the method of Example 3, but with the free base boiled up in dilute hydrochloric acid, the product allowed to crystallise and then recrystallised from alcohol and a little dilute hydrochloric acid. The hydrochloride has a melting point of 222° to 224° C. Analysis for nitrogen—calculated: 9.20%, found: 9.18%.

EXAMPLE 24

The compound having the formula:

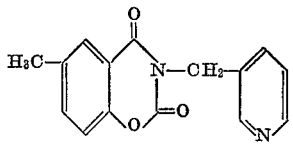

is obtained from the sodium salt of 6-methyldihydro-1,3-benzoxazine-2,4-dione with 3-picolyl chloride by the method of Example 5. It has a melting point of 150° to 151° C. Analysis for nitrogen—calculated: 10.43%, found: 10.38%.

EXAMPLE 25

The compound having the formula:

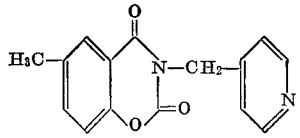

is obtained from the sodium salt of 6-methyldihydro-1,3-benzoxazine-2,4-dione with 4-picolyl chloride by the method of Example 5. It has a melting point of 161° C. Analysis for nitrogen—calculated: 10.43%, found: 10.24%.

EXAMPLE 26

The compound having the formula:

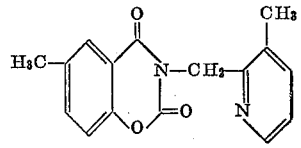

is obtained from the sodium salt of 6-methyldihydro-1,3-benzoxazine-2,4-dione with 6-methyl-2-picolyl chloride by the method of Example 5. It has a melting point of 135° to 136° C. Analysis for nitrogen—calculated: 9.92%, found: 9.82%.

EXAMPLE 27

The compound having the formula:

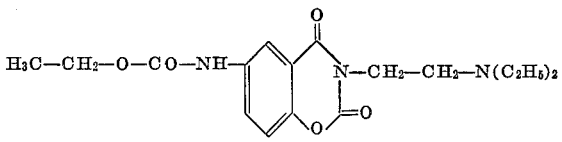

is obtained from the sodium salt of dihydro-1,3-benzoxazine-2,4-dione-6-carbamic acid ethyl ester with 2-diethylaminoethyl chloride by the method of Example 21. The hydrochloride has a melting point of 227° to 229° C. (with decomposition). Analysis for nitrogen—calculated: 10.89%, found: 10.90%.

EXAMPLE 28

The compound having the formula:

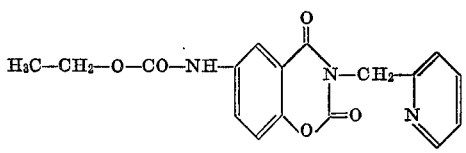

is obtained from the sodium salt of dihydro-1,3-benzoxaine-2,4-dione-6-carbamic acid ethyl ester with 2-picolyl chloride by the method of Example 5. It has a melting point of 183° to 185° C. Analysis for nitrogen—calculated: 12.33%, found: 12.31%.

EXAMPLE 29

The compound having the formula

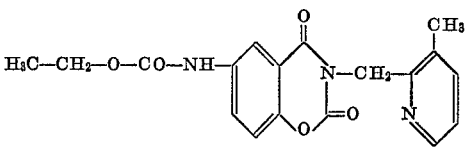

is obtained from the sodium salt of dihydro-1,3-benzoxazine-2,4-dione-6-carbamic acid ethyl ester with 6-methyl-2-picolyl chloride by the process of Example 5. It has a melting point of 179° to 180° C. Analysis for nitrogen—calculated: 11.82%, found: 11.80%.

EXAMPLE 30

The compound having the formula:

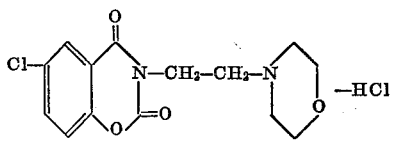

is obtained from the sodium salt of 6-chlorodihydro-1,3-benzoxazine-2,4-dione with N-β-chloroethylmorpholine by the method of Example 5, the free base being boiled up in ethanolic hydrochloric acid to convert it into the hydrochloride which is recrystallised from ethanol. The hydrochloride has a melting point of 258° to 260° C. (with decomposition). Analysis for nitrogen—calculated: 8.06%, found: 7.73%.

EXAMPLE 31

The compound having the formula:

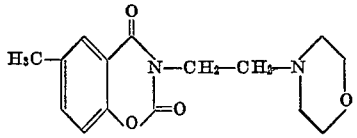

is obtained from the sodium salt of 6-methyldihydro-1,3-benzoxazine-2,4-dione with N-β-chloroethylmorpholine by the method of Example 5. It has a melting point of 130° to 131° C. Analysis for nitrogen—calculated: 9.65%, found: 9.64%.

EXAMPLE 32

Production of the compound having the formula:

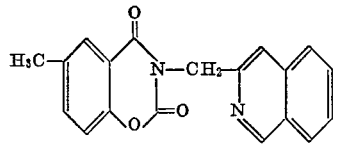

10 g. (0.05 mole) of the sodium salt of 6-methyldihydro-1,3-benzoxazine-2,4-dione is suspended in 40 ccm. of dimethylformamide and while stirring, the free base from 11.8 g. (including 10% excess) of 2-chloromethylquinoline hydrochloride in about 150 ccm. of benzene is added. The benzene is distilled off and the reaction mixture is stirred for seventy-five minutes at 100° to 105° C. The reaction mixture is cooled to room temperature and the reaction mixture is poured onto about half a litre of water. The deposited product is suction filtered and recrystallised from ethanol. It has a melting point of 168° to 169° C. Analysis for nitrogen—calculated: 8.80%, found: 8.79%.

EXAMPLE 33

The compound having the formula:

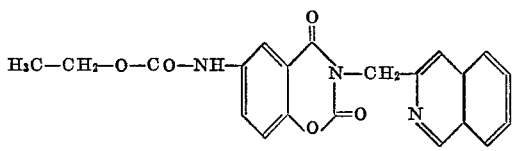

is obtained from the sodium salt of dihydro-1,3-benzoxazine-2,4-dione-6-carbamic acid ethyl ester with 2-chloromethylquinoline by the process of Example 32 but recrystallising from dioxane. It has a melting point of 229° to 230° C. Analysis for nitrogen—calculated: 10.75%, found: 10.73%.

EXAMPLE 34

The compound having the formula:

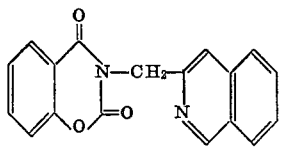

is obtained from the sodium salt of dihydro-1,3-benzoxazine-2,4-dione with 2-chloromethylquinoline by the process of Example 32. It has a melting point of 195° to 196° C. Analysis for nitrogen—calculated: 9.20%, found: 9.24%.

EXAMPLE 35

The compound having the formula:

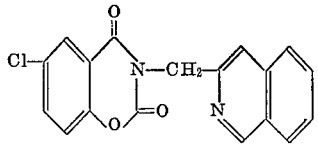

is obtained from the sodium salt of 6-chlorodihydro-1,3-benzoxazine-2,4-dione with 2-chloromethylquinoline by the process of Example 32 but recrystallising from dioxane. It has a melting point of 194° to 195° C. Analysis for nitrogen—calculated: 8.26%, found: 8.31%.

EXAMPLE 36

The compound having the formula:

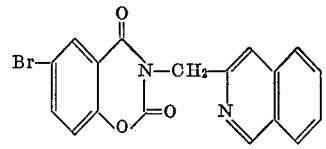

is obtained from 6-bromodihydro-1,3-benzoxazine-2,4-dione with 2-chloromethylquinoline by the process of Example 32 but using dioxane for recrystallisation. The melting point is 192° to 193° C. Analysis for nitrogen—calculated: 7.31%, found: 7.10%.

EXAMPLE 37

The compound having the formula:

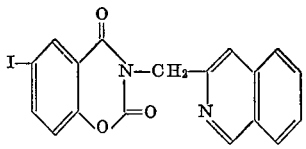

is obtained from the sodium salt of 1-iododihydro-1,3-benzoxazine-2,4-dione with 2-chloromethylquinoline by the process of Example 32 but recrystallising from dioxane. Its melting point is 226° to 227° C. Analysis for nitrogen—calculated: 6.50%, found: 6.47%.

EXAMPLE 38

Production of the compound:

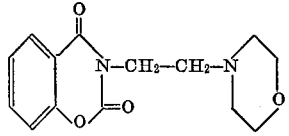

18.5 g. (0.1 mole) of the sodium salt of dihydro-1,3-benzoxazine-2,4-dione is suspended in 150 ccm. of absolute ethanol and while stirring 16.5 g. (including 10% excess) of N-β-chloroethylmorpholine is added. The whole is boiled under reflux for five hours while stirring. The hot reaction mixture is then suction filtered and the filtrate is evaporated to dryness. A viscous syrup is obtained which after some time crystallises out as a solid and is recrystallised from ethanol. It has a melting point of 117° to 119° C. Analysis for nitrogen—calculated: 10.13%, found: 10.11%.

EXAMPLE 39

The compound having the formula:

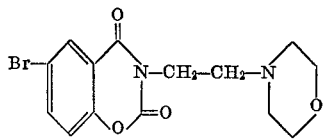

is obtained from the sodium salt of 6-bromodihydro-1,3-benzoxazine-2,4-dione with N-β-chloroethylmorpholine by the process of Example 38, the hydrochloride being prepared however by boiling up in dilute hydrochloric acid and allowed to crystallise. It has a melting point of 255° to 259° C. (with decomposition). Analysis for nitrogen—calculated: 7.15%, found: 7.10%.

EXAMPLE 40

The compound having the formula:

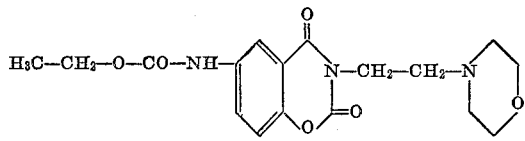

is obtained from the sodium salt of dihydro-1,3-benzoxazine-2,4-dione-6-carbamic acid ethyl ester with N-β-chloroethylmorpholine by the process of Example 38. It has a melting point of 177° to 178° C.

*Analysis.*—Calculated (percent): C, 56.20; H, 5.83; N, 11.58. Found (percent): C, 56.19; H, 5.83; N, 11.58.

The sulphate of the above compound has a melting point of 199° to 200° C. Analysis for nitrogen—calculated: 9.12%, found: 9.26%.

EXAMPLE 41

The compound having the formula:

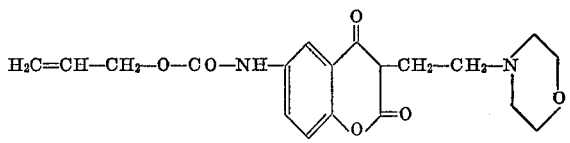

is obtained from the sodium salt of dihydro-1,3-benzoxazine-2,4-dione-6-carbamic acid allyl ester with N-β-chloroethylmorpholine by the process of Example 38. It has a melting point of 163° C. Analysis for nitrogen—calculated: 10.62%, found: 10.74%.

EXAMPLE 42

The compound having the formula:

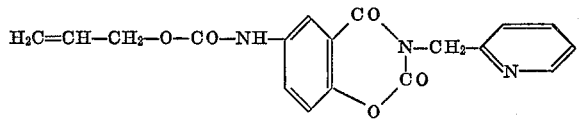

is obtained from the sodium salt of dihydro-1,3-benzoxazine-2,4-dione-6-carbamic acid allyl ester with 2-picolyl chloride by the method of Example 5, but recrystallising from a mixture of dioxane and ethyl alcohol. It has a melting point of 175° to 176° C. Analysis for nitrogen—calculated: 11.90%, found: 11.90%.

EXAMPLE 43

Production of the compound having the formula:

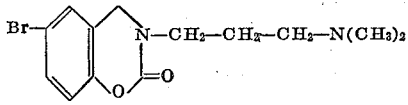

13.2 g. (0.05 mole) of the sodium salt of 6-bromodihydro-1,3-benzoxazine-2,4-dione is suspended in 40 ccm. of dimethylformamide and while stirring 6.8 g. (10% excess) of 3-dimethylamino-1-propyl chloride is added. Stirring is continued for five hours on a boiling waterbath. The whole is then cooled to room temperature and poured onto 1 litre of water, saturated with ammonium sulphate and extracted with chloroform. The residue, after the chloroform has been distilled off, is recrystallised from methylene chloride. It sinters at 91° C. and melts at 100° C. Analysis for nitrogen—calculated: 8.57%, found: 8.50%.

EXAMPLE 44

The compound having the formula:

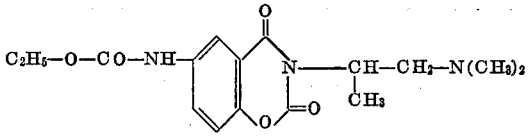

is obtained from the sodium salt of dihydro-1,3-benzoxazine-2,4-dione-6-carbamic acid ethyl ester with 1-dimethylamino-2-propyl chloride by the method of Example 5, but recrystallising from methylene chloride. It has a melting point of 181° to 183° C. Analysis for nitrogen—calculated: 12.53%, found: 12.52%.

What is claimed is:
1. A compound of the formula:

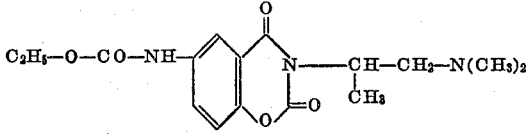

References Cited

"Chemical Abstracts," vol. 58, col. 13945 (1963).
Sugimoto et al.: "Yakugaku Kenkyu," vol. 34, pp. 100–6 (1962).

HENRY R. JILES, Primary Examiner

R. P. BOND, Assistant Examiner

U.S. Cl. X.R.

424—248